United States Patent
Collins (10) Patent No.: US 11,586,467 B1
(45) Date of Patent: Feb. 21, 2023

(54) METHOD AND SYSTEM FOR DYNAMICALLY AND RELIABLY SCALING DATA PROCESSING PIPELINES IN A COMPUTING ENVIRONMENT

(71) Applicant: INTUIT INC., Mountain View, CA (US)

(72) Inventor: Alexander Edwin Collins, Pleasant Hill, CA (US)

(73) Assignee: INTUIT INC., Mountain View, CA (US)

( * ) Notice: Subject to any disclaimer, the term of this patent is extended or adjusted under 35 U.S.C. 154(b) by 0 days.

(21) Appl. No.: 17/709,229

(22) Filed: Mar. 30, 2022

(51) Int. Cl.
 *G06F 9/50* (2006.01)
(52) U.S. Cl.
 CPC .................... *G06F 9/50* (2013.01)
(58) Field of Classification Search
 CPC ........ G06F 9/50; G06F 9/5005; G06F 9/5011; G06F 9/455; G06F 9/45533; G06F 9/45537; G06F 9/45558; G06F 2009/45562; G06F 2009/45575
 See application file for complete search history.

(56) References Cited

U.S. PATENT DOCUMENTS

| | | | | |
|---|---|---|---|---|
| 8,181,182 | B1* | 5/2012 | Martin | G06F 9/485 718/104 |
| 10,061,858 | B2* | 8/2018 | Park | G06F 16/955 |
| 10,474,475 | B2* | 11/2019 | De Waegeneer | G06F 9/445 |
| 10,579,435 | B2* | 3/2020 | Bhandarkar | G06F 9/5027 |
| 10,698,733 | B1* | 6/2020 | Lee | G06F 9/44505 |
| 10,776,152 | B2* | 9/2020 | Nachum | G06F 9/4843 |
| 10,909,484 | B2* | 2/2021 | Palmer | G06Q 10/06316 |
| 11,055,135 | B2* | 7/2021 | Popovic | G06F 9/4881 |
| 11,327,795 | B1* | 5/2022 | Mundra | G06F 11/3051 |
| 2003/0018508 | A1* | 1/2003 | Schwanke | G06Q 10/10 705/7.26 |
| 2003/0187982 | A1* | 10/2003 | Petit | H04L 63/08 709/225 |
| 2010/0257269 | A1* | 10/2010 | Clark | G06F 9/4856 718/1 |
| 2013/0268258 | A1* | 10/2013 | Patrudu | G06F 40/40 704/9 |
| 2015/0222696 | A1* | 8/2015 | Park | G06F 16/955 709/201 |
| 2015/0356141 | A1* | 12/2015 | Yan | G06F 16/284 707/718 |

(Continued)

*Primary Examiner* — Hiren P Patel
(74) *Attorney, Agent, or Firm* — Patterson + Sheridan, LLP (57) ABSTRACT

Certain embodiments of the present disclosure provide techniques for dynamically and reliably scaling a data processing pipeline in a computing environment. The method generally includes receiving a definition of a data pipeline to be instantiated on a set of resources in a computing environment. The data pipeline is converted into a plurality of steps, each step being defined as one or more workers. The one or more workers are instantiated. Each worker generally includes a user process and a processing coordinator to coordinate termination of the user process. Communications are orchestrated between one or more data sources and the one or more workers. The one or more workers are terminated by invoking a termination coordination process exposed by the user process and the processing coordinator associated with each worker of the one or more workers.

18 Claims, 4 Drawing Sheets

(56) References Cited

U.S. PATENT DOCUMENTS

| | | | |
|---|---|---|---|
| 2016/0371122 A1* | 12/2016 | Nair | G06F 9/546 |
| 2017/0038919 A1* | 2/2017 | Moss | G06F 3/04817 |
| 2018/0114157 A1* | 4/2018 | McAlynn | G06Q 10/0631 |
| 2019/0332423 A1* | 10/2019 | Shanmugam | G06F 9/4881 |
| 2019/0391845 A1* | 12/2019 | Gasser | G06F 9/4887 |
| 2021/0297499 A1* | 9/2021 | Slovetskiy | H04W 72/005 |

* cited by examiner

METHOD AND SYSTEM FOR DYNAMICALLY AND RELIABLY SCALING DATA PROCESSING PIPELINES IN A COMPUTING ENVIRONMENT

INTRODUCTION

Embodiments of the present disclosure relate to scaling data processing pipelines in a computing environment, and more specifically to reliably scaling data processing pipelines in a reliable manner to prevent data loss while scaling the data processing pipelines.

BACKGROUND

In various applications, data processing pipelines may be defined to process data from various sources. For example, data processing pipelines may be used to generate data sets that can be used to train machine learning models and generate predictions (or "inferences") for specific use cases based on the trained models, collate data that can be used for various testing and diagnostic purposes, and the like. To efficiently process data, in some cases, these data processing pipelines may ingest, process, and output data to one or more data repositories (e.g., a data lake) in real time, or in near-real-time. By ingesting, processing, and outputting data in real time or near-real-time, an amount of time needed to prepare a data set for additional use (e.g., training a machine learning model, generating predictions, performing testing or diagnostic operations on a computing system, etc.) may be minimized.

Generally, computing resources on which these data processing pipelines execute may be constrained by various resource limitations. For example, a computing resource may have a limited amount of processing capability (e.g., measured in terms of a number of operations per second that can be processed by one or more processors, such as central processing units, graphics processing units, neural processing units, digital signal processors, etc.), a limited amount of memory, limited network bandwidth, and other limitations. Thus, as the amount of data to be processed increases, additional computing resources may need to be assigned for execution of the data processing pipelines. Similarly, as the amount of data to be processed decreases, some computing resources may be idle and may be re-assigned to other purposes.

Terminating operations on computing resources that are no longer needed may create a risk of data loss if the operations are terminated improperly. For example, if a process in the data processing pipeline is terminated while the process is running, the ingested data, and the expected output of processing the ingested data, may be lost, which may degrade the quality of the data generated by the data processing pipeline. Further, until the process is terminated, the process may be considered a candidate for receiving additional requests to process data. These requests may be lost if the process is terminated before the process can respond to these requests.

Accordingly, techniques are needed to reliably scale data processing pipelines in a computing environment.

BRIEF SUMMARY

Certain embodiments provide a computer-implemented method for scaling a data processing pipeline in a computing environment. The method generally includes receiving a definition of a data pipeline to be instantiated on a set of resources in a computing environment. The data pipeline is converted into a plurality of steps, each step being defined as one or more workers. The one or more workers are instantiated. Each worker generally includes a user process and a processing coordinator to coordinate termination of the user process. Communications are orchestrated between one or more data sources and the one or more workers. The one or more workers are terminated by invoking a termination coordination process exposed by the user process and the processing coordinator associated with each worker of the one or more workers.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain embodiments of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Embodiments of the present disclosure provide apparatuses, methods, processing systems, and computer-readable mediums for dynamically and reliably scaling data processing pipelines in a computing environment. Generally, a data processing pipeline may include a plurality of workers that ingest data from one or more data sources, process the ingested data, and output processed data to one or more data repositories. These workers, as discussed herein, generally include a processing coordinator and a user process that work in conjunction with each other to ingest data from data sources, process data, emit processed data to data sinks, and coordinate the instantiation and termination of the workers so that data is not lost during the termination process. These workers may be instantiated as additional computing resources are needed to allow data to be processed in a performant manner and may be terminated as computing resources previously allocated to the data processing pipeline become idle.

In order to avoid wasting compute resources during execution of the data processing pipeline and avoid data loss, instantiation and termination of workers may need to be carefully controlled during scaling procedures that instantiates new workers (e.g., when additional compute resources are needed) or terminates existing workers (e.g., when compute resources are idle or are intermittently used). However, a data processing pipeline may include a plurality of processes and a scheduler that controls these processes, and these information about these processes may not cross process boundaries. Thus, while the scheduler in the data processing pipeline can control when the workers perform various operations to process data, the scheduler may not have information that would allow for workers to be terminated such that data loss events are minimized or avoided. That is, a scheduler may not be aware of whether the worker is currently processing data and/or has messages pending processing when a termination event occurs, and thus may terminate a worker while the worker is processing data or has messages pending processing. Therefore, the data processing pipeline not reliably terminate workers during a resource deallocation phase in a manner that prevents data loss.

Embodiments described herein generally provide techniques that allow for the dynamic and reliable scaling of data processing pipelines in a computing environment. Generally, workers in the data processing pipeline may include a processing coordinator and a user process. The processing coordinator and user process may be instantiated when a new instance of the worker is generated and assigned to execute tasks in the data processing pipeline. When a worker is to be terminated, the processing coordinator associated with the worker generally causes the worker process associated with the worker to stop accepting data processing requests from other data sources and to complete the processing of any currently pending requests that are being processed by the user process. After the user process completes processing the currently pending requests, the worker may terminate, and the resources allocated to the terminated worker may be re-allocated to other processes or to an idle resource pool for future allocation to other processes.

By using a processing coordinator process in each worker to coordinate the termination of the worker in a data processing pipeline, the data processing pipeline may be reliably scaled to account for changes in the amount of data to be processed by the data processing pipeline. Generally, the processing coordinator process may block the user process of a worker from accepting new requests to process data and may wait for currently pending requests to be completed before allowing the user process to be terminated. Thus, currently pending requests may be completed without data loss, and a worker designated for termination may not accept additional requests that may delay termination of the worker or may cause the worker to terminate during processing. Accordingly, aspects of the present disclosure may minimize the risk of data loss in data processing pipelines for which execution is dynamically scaled (e.g., in which workers for the data processing pipelines are dynamically instantiated and terminated) in a computing environment and allow for computing resources to be released for use in other tasks.

Figure 1:
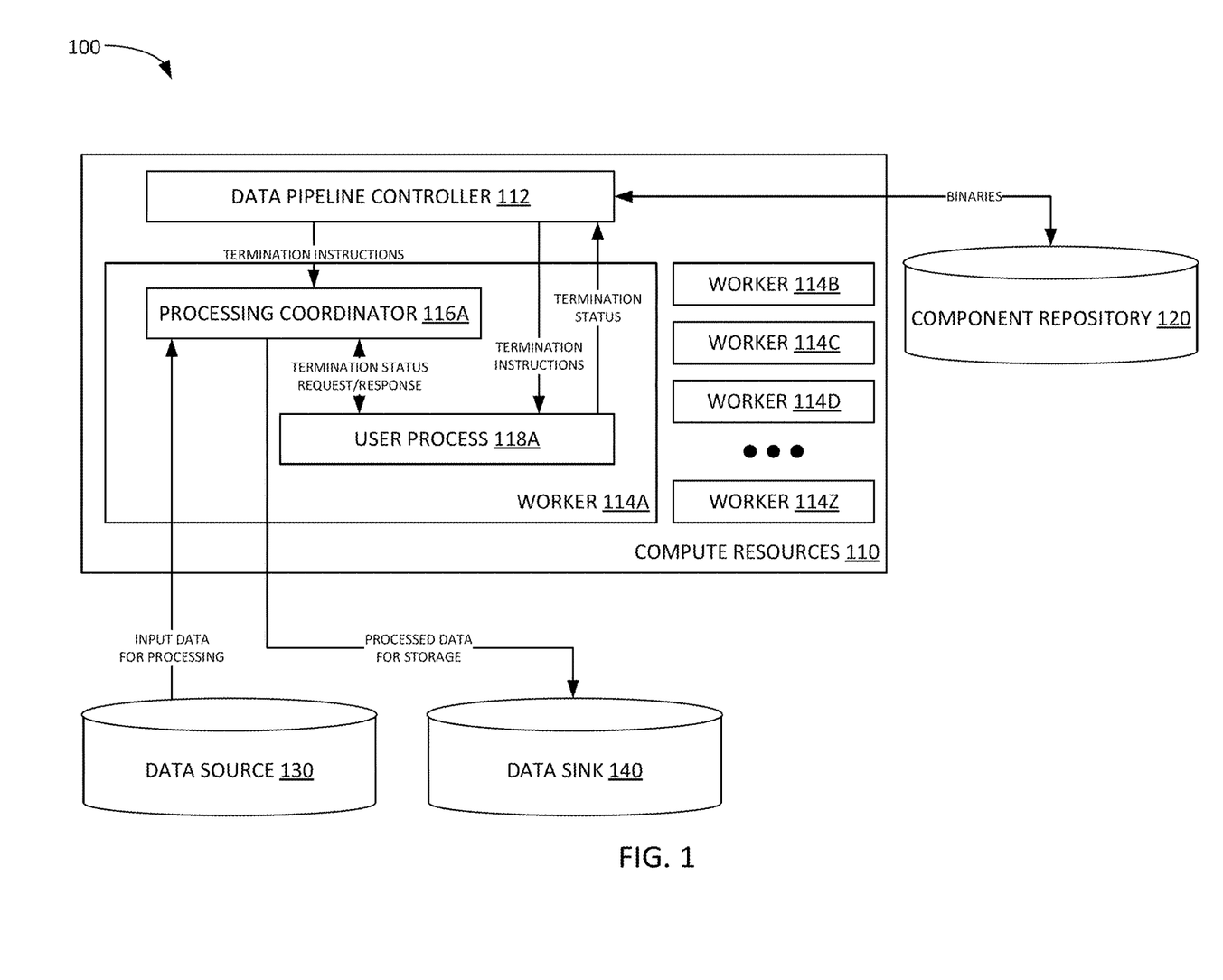
FIG. 1 illustrates an example computing environment in which a data processing pipeline is dynamically and reliably scaled in a computing environment.

Example Systems for Dynamically and Reliably Scaling of a Data Processing Pipeline in a Computing Environment FIG. 1 illustrates an example computing environment 100 in which a data processing pipeline may be dynamically and reliably scaled to minimize a risk of data loss during scaling.

As illustrated, computing environment 100 includes compute resources 110 on which components of the data processing pipeline may be executed, a component repository 120, a data source 130, and a data sink 140.

Compute resources 110 generally represent a variety of computing devices on which components of a data processing pipeline may be executed, such as a server computer, a desktop computer, a virtual computing instance in a distributed computing environment or a containerized computing environment, or the like. While illustrated as a single resource in FIG. 1, it should be recognized that compute resources 110 may include resources from any number of computing devices which may be dynamically allocated for use in executing a data processing pipeline and may be dynamically deallocated from the set of resources used to execute the data processing pipeline as resource requirements for the data processing pipeline change.

To execute a data processing pipeline on compute resources 110, a data pipeline controller 112 generally receives a definition of the data processing pipeline to be executed on a set of compute resources 110. The definition of the data pipeline may be structured, for example, as a graph of processes that map input data from various data sources to output data committed to various data sinks. A graph defining the data pipeline may be, for example, a directed graph, with each node in the graph corresponding to a specific process (e.g., as discussed in further detail below, a specific type of worker 114) in the data pipeline. Edges in the graph, illustrating connections between different nodes (e.g., processes), may be directed to illustrate a direction in which data flow in the data processing pipeline (e.g., from a source node to a target node). A node with an input, but no output, defined in the graph definition of the data processing pipeline may represent a terminal node for a specific type of data in the data processing pipeline, and the worker associated with such a node may be configured to write specified data to one or more data sinks in which processed data is to be stored.

Based on the graph definition of the data processing pipeline, data pipeline controller 112 can convert the data pipeline into a plurality of steps. Generally, each step may be defined as one or more nodes, associated with workers 114A-Z to be executed on compute resources 110, which may be executed in parallel to process data in the data processing pipeline. Each step in the data pipeline may be associated with a number of workers 114A-Z that are defined based on metrics generated by workers 114A-Z, such as a number of pending messages waiting to be processed by workers 114A-Z, a processing latency between reception of a message and when the workers 114 begin processing a message, a total elapsed time between reception of a message and completion of message processing by the workers 114A-Z, and the like. In some aspects, when a data processing pipeline is instantiated, historical data can be used to define the number of workers 114A-Z to be instantiated for a given step defined in the data processing pipeline.

Generally, during execution of the data processing pipeline, data pipeline controller 112 can dynamically instantiate and terminate workers 114A-Z based on various metrics. For example, if the number of messages pending processing across the workers 114A-Z falls below a threshold number of pending messages or if the latency between message reception and commencement of message processing at a worker 114A-Z falls below a threshold latency value, data pipeline controller 112 can determine that the number of workers 114A-Z currently instantiated to execute processes in the data processing pipeline is more than a minimum number of processes needed for the current volume of messages pending processing. Thus, data pipeline controller 112 can identify one or more workers 114A-Z to terminate and instantiate the termination process, as discussed in further detail below. Similarly, if the number of messages pending across the workers 114A-Z exceeds a threshold number of pending messages, or if the latency between message reception and commencement of message processing at a worker 114A-Z exceeds a threshold latency value, the data pipeline controller 112 can determine that additional instances of a worker 114A-Z should be instantiated, as discussed in further detail below.

To allow for data pipeline controller 112 to dynamically instantiate and terminate workers 114A-Z, data pipeline controller 112 may include various message listeners that can monitor traffic between data sources and workers 114A-Z. In some aspects, however, data pipeline controller 112 may not be able to monitor traffic between the data sources and workers 114A-Z, and may thus rely on metrics reported by the workers 114A-Z to determine whether to scale up by instantiating new instances of worker 114 or scale down by terminating existing instances of worker 114. The metrics reported by workers 114A-Z may be reported periodically and may include various data points that can be used to determine whether data pipeline controller 112 should instantiate new workers 114A-Z or terminate existing workers 114A-Z. For example, workers 114A-Z can report instantaneous data (e.g., the current number of messages pending processing at the time the worker generates the report), time-weighted data, average metrics (e.g., an average number of messages pending processing over a defined time period, an average message latency over the defined time period, etc.), or other statistically derived metrics that data pipeline controller 112 can use to determine whether to instantiate new instances of workers 114A-Z or terminate existing instances of workers 114A-Z.

While the following description describes the instantiation and termination of a worker with respect to worker 114A, it should be recognized that any worker 114A-Z may be instantiated and terminated in the same manner.

To instantiate a new instance of worker 114A, data pipeline controller 112 can retrieve various application binaries (or other executable code) from a component repository 120 and deploy these application binaries to a compute resource on which worker 114A is to be executed. In some aspects, the binaries retrieved from component repository 120 may include references to application source code that is under source control. In such a case, an initialization process for worker 114A can retrieve (e.g., check out) the application source code from a code repository (not illustrated), compile the code into an executable, and execute the code for the worker 114A. During the initialization process, data pipeline controller 112 can also retrieve, from component repository, an executable binary for processing coordinator 116A. As illustrated, processing coordinator 116A may be associated with a worker 114A and may be used to control termination of that worker 114A in such a manner that the risk of data loss is mitigated. As discussed in further detail herein, the processing coordinator 116A may coordinate with the user process 118A of the worker 114A to halt reception of messages prior to terminating user process 118A so that when user process 118A terminates, user process 118A will have completed processing any pending messages and will not have any further messages awaiting processing. While FIG. 1 illustrates that processing coordinator 116A is associated with a specific worker 114A, it should be recognized that a processing coordinator 116 may be associated with any number of workers 114 and may be used to control termination of each of the workers 114 with which processing coordinator 116 is associated.

After data pipeline controller 112 instantiates processing coordinator 116A for worker 114A, data pipeline controller 112 can then instantiate user process 118A for worker 114A. Generally, user process 118A may be a process that implements an image contract defined by an application programming interface (API) for the data processing pipeline. This image contract may specify, for example, the functions implemented in the process, input data sources, output data sources, and other information that defines how the process operates. Because user process 118A implements a specified image contract, user process 118A may be written in any programming language, whether compiled a priori or just-in-time or interpreted, so long as user process 118A implements the features defined in the image contract. Generally, the image contract may specify that the user process 118A includes a plurality of messaging endpoints, such as endpoints implementing the hypertext transfer protocol (HTTP). These messaging endpoints may allow the user process 118A to indicate that the user process 118A is ready to accept messages from one or more external data sources (e.g., data source 130) and to actually accept messages from one or more external data sources, processing coordinator 116A, and/or data pipeline controller 112. Once processing coordinator 116A and user process 118A are instantiated, worker 114A may begin processing data received from one or more data sources and writing processed data to one or more data sinks.

Generally, in determining that worker 114A is ready to process data, processing coordinator 116A and user process 118A may engage in a readiness handshake process. During this readiness handshake process, processing coordinator 116A can request readiness information from user process 118A. If user process 118A returns an indication that user process 118A is not ready to process data, processing coordinator 116A can wait a defined amount of time before requesting readiness information from user process 118A again. After user process 118A returns an indication that user process 118A is ready to process data, processing coordinator 116A can forward inputs from one or more data sources (e.g., data source 130) to user process 118A and forward outputs from user process 118A to one or more data sinks (e.g., data sink 140). In some aspects, where the data source is a non-stream data source, such as a flat file or other non-streaming data source, processing coordinator 116A can convert the data source into an abstraction that allows user process 118A to generate an acknowledgment that a message has been processed. Similarly, where the data sink is a non-stream data sink, processing coordinator 116A can convert the processed data into a file or other non-stream data format that can be committed to the data sink.

To terminate worker 114A, data pipeline controller 112 can use metric information reported by worker 114A or gathered by data pipeline controller 112 to determine that the worker 114A is to be terminated. As discussed, the determination that the worker 114A is to be terminated may be based on, for example, metrics indicating that the worker 114A is using resources inefficiently (e.g., has less than a threshold number of pending messages to process, has a message processing latency below a threshold latency value, is idle more than a threshold amount of time, etc.). Because data pipeline controller 112 may not be able to "reach across" process boundaries to determine whether the user process 118A of worker 114A is currently processing messages and/or has pending messages awaiting processing, data pipeline controller 112 may not be able to directly terminate user process 118 without incurring a risk of data loss. Thus, to "gracefully" terminate a worker 114A (e.g., terminate worker 114A to minimize a risk of data loss), including processing coordinator 116A and user process 118A, data pipeline controller 112 may initiate termination of the worker 114A by issuing termination instructions to user process 118A that instructs user process 118A to invoke a termination procedure at processing coordinator 116A.

When user process 118A receives the request to invoke a termination procedure at processing coordinator 116A, processing coordinator 116A and user process 118A can perform a termination handshake procedure to determine when the worker 114A can be terminated. To prevent data loss from occurring as a consequence of the termination procedure, processing coordinator 116A can halt message acceptance from external data sources. Meanwhile, user process 118A can continue to process any pending messages. When the user process has both completed processing pending messages and determined that processing coordinator 116A has halted acceptance of any new messages, user process 118A can determine that worker 114A is in condition for termination on compute resources 100. Thus, user process 118A can terminate and provide an indication to data pipeline controller 112 that the user process 118A of worker 114A has terminated. Based on receiving the indication that user process 118A has terminated, data pipeline controller 112 can transmit a termination message to processing coordinator 116A. When processing coordinator 116A terminates and signals to data pipeline controller 112 that termination is complete, worker 114A may be considered terminated. The compute resources 110 allocated to worker 114A may thus be released for use by other workers 114B-Z defined in the data processing pipeline or for other tasks in computing environment 100.

By terminating a worker 114 using termination commands processed by both a processing coordinator 116 and a user process 118 of the worker 114, the data processing pipeline may be scaled down reliably such that data is not lost during the termination process. A worker 114 may only be terminated when the processing coordinator 116 for the worker 114 has stopped receiving messages from one or more data sources 130 and when the user process 118 for the worker 114 has completed processing its pending messages. That is, a termination procedure invoked by a data pipeline controller 112 may not immediately terminate a worker 114, but instead invokes a procedure that will eventually terminate the worker 114 so that data pending processing by the worker is processed and output to data sink 140 instead of being lost due to sudden and immediate termination of the worker 114.

Figure 2:
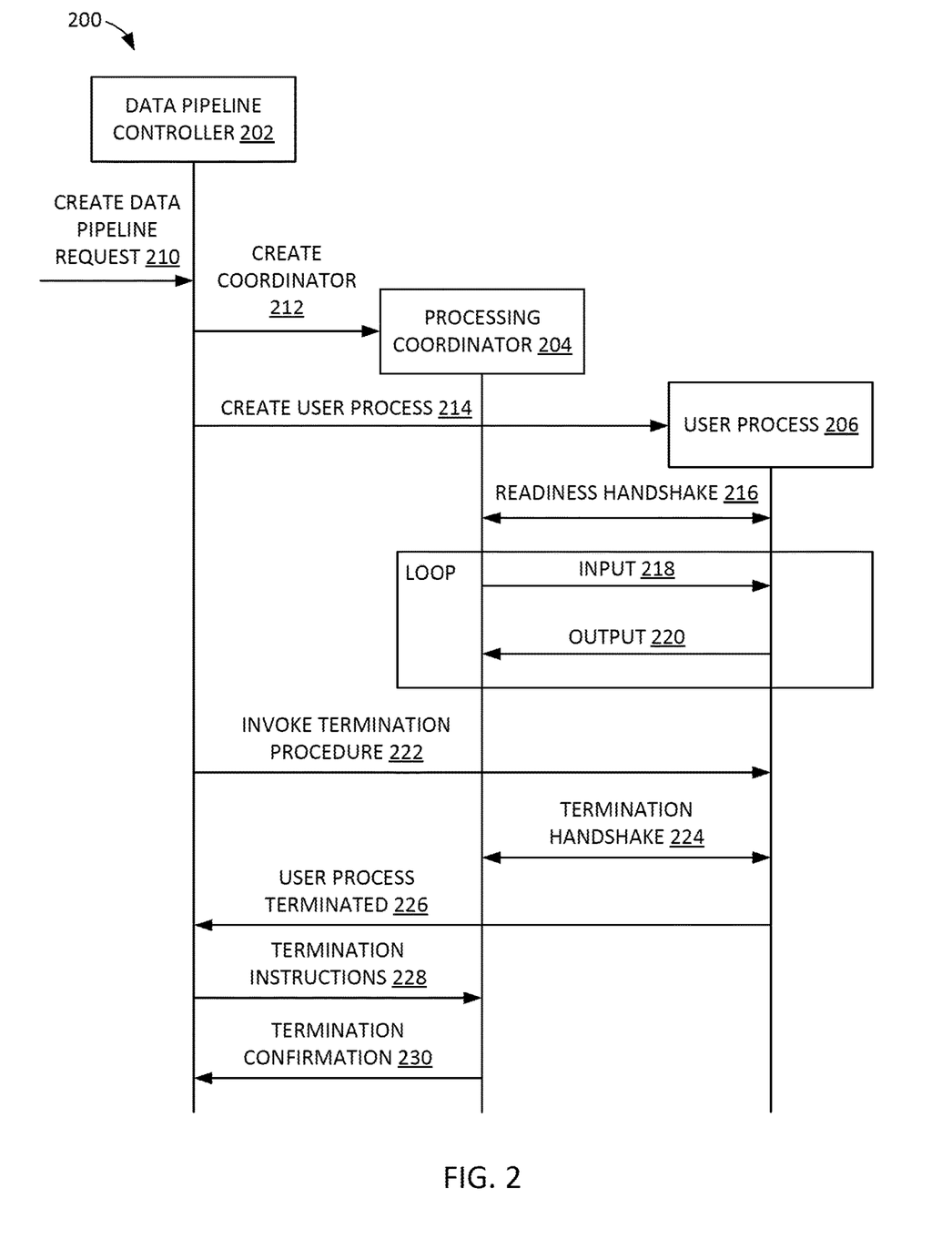
FIG. 2 illustrates example messages that may be exchanged between components in a data processing pipeline to dynamically and reliably scale the data processing pipeline in a computing environment.

Example Message Flow for Dynamically and Reliably Scaling of a Data Processing Pipeline in a Computing Environment FIG. 2 illustrates example message flow diagram 200 illustrating messages that may be exchanged between a data pipeline controller 202, processing coordinator 204, and user process 206 to dynamically instantiate and terminate a worker in a data processing pipeline. Data pipeline controller 202 may correspond to data pipeline controller 112 illustrated in FIG. 1; processing coordinator 204 may correspond to processing coordinator 116 illustrated in FIG. 1; and user process 206 may correspond to user process 118 illustrated in FIG. 1.

As illustrated, to instantiate the data processing pipeline, data pipeline controller 202 may receive a message 210 requesting creation of a data processing pipeline. The message may be received, for example, from an external computing system, such as a client device, which may control the instantiation of a data processing pipeline. The message may specify the data pipeline as a graph of processes that map, filter, and process messages from data sources to data sinks in a computing environment. These data sources may be, for example, other applications executing in a computing environment, other data repositories in which data to be processed through the data processing pipeline is stored, or the like.

As discussed, data pipeline controller 202 can convert the definition of the data pipeline from a graph into a plurality of steps, with each step corresponding to one or more workers that can perform a set of tasks (e.g., in parallel, without dependencies on other tasks in that step). Data pipeline controller 202 can instantiate a number of workers, including a processing coordinator and a user process, based on various metrics associated with the workers in a step, such as historical amounts of messages generated for these workers, performance targets defined for the workers in a step of the data processing pipeline, and the like.

To scale up and instantiate a worker (e.g., in initializing the data processing pipeline or scaling up to add additional workers to the data processing pipeline), data pipeline controller 202 can emit message 212 including instructions to create a coordinator process and message 214 to create a user process for the worker being instantiated. To launch processing coordinator 204, data pipeline controller 202 can retrieve a processing coordinator binary (e.g., from an application component repository, such as component repository 120 illustrated in FIG. 1) and launch the processing coordinator binary on the compute resources (e.g., physical computer, virtual computing instance, container, etc.) allocated for the worker. Similarly, to launch user process 206, data pipeline controller 202 can retrieve a user process binary (e.g., from the application component repository) and launch the user process binary on the compute resources allocated for the worker.

After processing coordinator 204 and user process 206 are launched, processing coordinator 204 and user process 206 may participate in a readiness handshake process 216 to determine when the processing coordinator 204 and user process 206 are ready to process data from one or more data sources into one or more data sinks. The readiness handshake process 216 generally includes processing coordinator 204 querying user process 206 for its readiness to begin processing data from the one or more data sources defined as inputs into user process 206 in the definition of the data processing pipeline. If user process 206 returns an indication that it is not ready to begin processing data from the one or more data sources, processing coordinator 204 can wait a defined amount of time before requesting readiness information from user process 206 again.

Once user process 206 indicates to processing coordinator 204 that it is ready to process data from the one or more data sources defined as inputs into the user process 206, processing coordinator 204 and user process 206 can receive inputs 218 from one or more data sources and generate outputs 220 to write to one or more data sinks in a loop while processing coordinator 204 and user process 206 are active. Generally, processing coordinator 204 may coordinate the dispatch of messages, files, and other data between user process 206, the one or more data sources used as inputs, and one or more data sinks in which outputs of the user process 206 are to be committed.

During operations, the user process 206 and/or processing coordinator 204 may (though not illustrated) report various metrics to data pipeline controller. These metrics may include information such as a number of messages awaiting processing, message processing latency, and other information indicative of whether the worker (e.g., the combination of processing coordinator 204 and user process 206) is sufficiently loaded to justify the allocation of compute resources to the worker. If data pipeline controller 202 determines that the allocation of compute resources to the worker is no longer warranted, data pipeline controller 202 can transmit a message 222 to user process 206 to invoke a process termination procedure and terminate the worker.

In response to receiving message 222, processing coordinator 204 and user process 206 can participate in a termination handshake procedure 224. In the termination handshake procedure, user process 206 can query processing coordinator 204 to determine whether processing coordinator 204 has stopped accepting messages from the one or more data sources used as inputs into user process 206. Generally, user process 206 may not be in a condition to terminate until user process 206 has stopped accepting messages from the one or more data sources, as termination of the processing coordinator 204 and user process 206 while messages are pending may result in a loss of data within a computing system (e.g., due to requests to process data that are transmitted and accepted, but never satisfied). When processing coordinator 204 confirms that it has stopped accepting messages from the one or more data sources and that no messages are pending processing, user process 206 can determine that the worker can be safely terminated. Thus, user process 206 may terminate itself and signal that the user process is terminated via message 226 transmitted to data pipeline controller 202. Upon receiving message 226, data pipeline controller 202 can determine that it is now safe to terminate processing coordinator 204 and transmit termination instructions 228 to processing coordinator 204. Subsequently, processing coordinator 204 can terminate operations and signal such termination via termination confirmation message 230.

Figure 3:
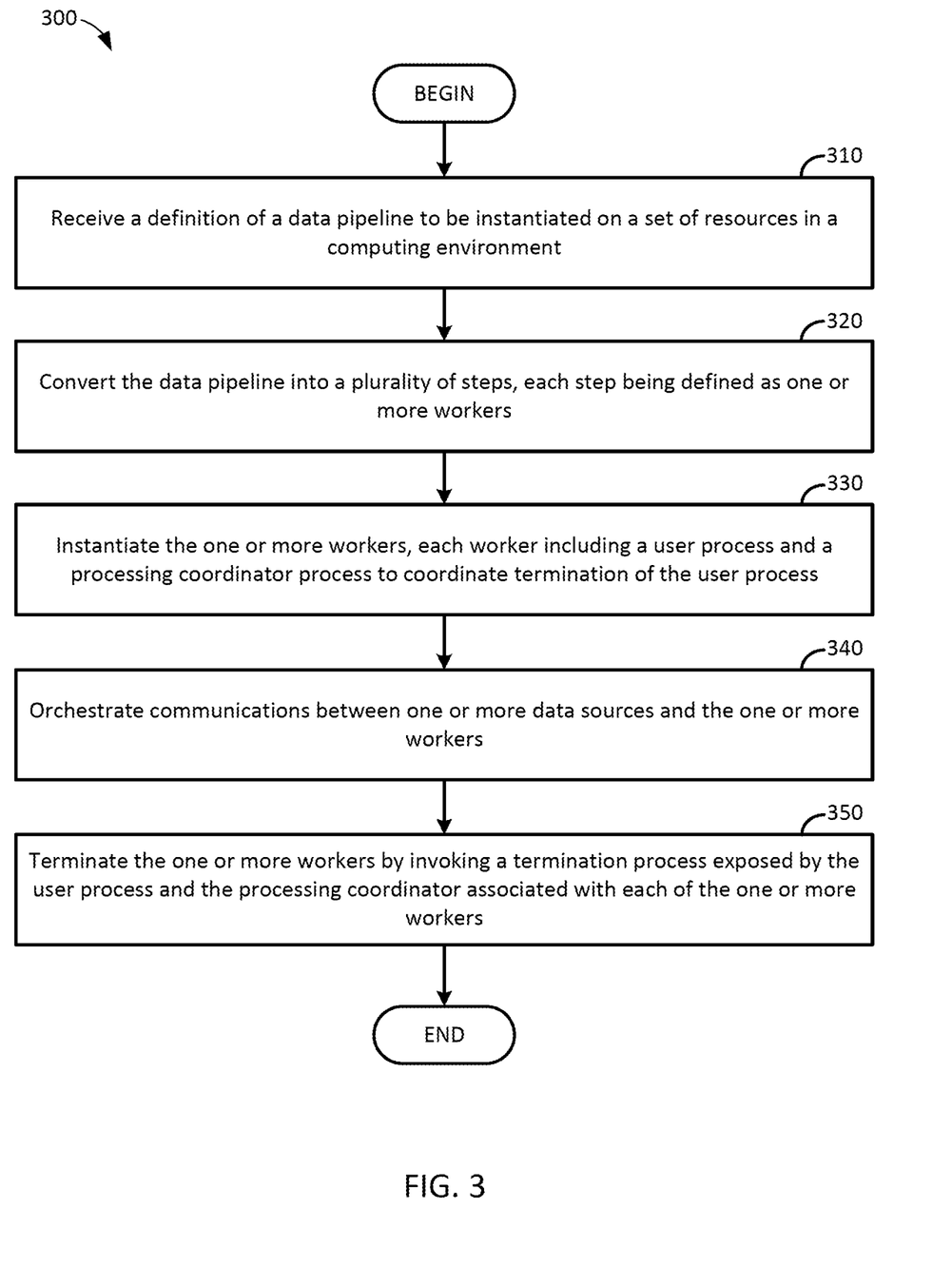
FIG. 3 illustrates example operations for dynamically and reliably scaling a data processing pipeline in a computing environment.

Example Dynamic and Reliable Scaling of a Data Processing Pipeline in a Computing Environment FIG. 3 illustrates example operations 300 that may be performed to dynamically and reliably scale a data processing pipeline in a computing environment. Operations 300 may be performed, for example, by a data pipeline controller executing on computing resources in a computing environment (e.g., data pipeline controller 112 executing on compute resources 110, as illustrated in FIG. 1).

As illustrated, operations 300 begin at block 310 with receiving a definition of a data processing pipeline to be instantiated on a set of resources in a computing environment (e.g., via request 210 illustrated in FIG. 2). In some aspects, the definition of the data pipeline may be received from an external system, such as a client device that manages the data processing pipeline and can instantiate data processing operations for data stored in one or more data sources.

In some aspects, the definition of the data pipeline to be instantiated on the set of resources may include a directed graph. The directed graph generally identifies a plurality of steps in the data processing pipeline and relationships between each step of the plurality of steps in the data processing pipeline. For example, the directed graph may be represented by nodes representing different processes in the data pipeline and edges connecting nodes in the graph that illustrate a direction in which data flow in the data processing pipeline (e.g., from a source node to a target node). A node with an input, but no output, defined in the graph definition of the data processing pipeline may represent a terminal node for a specific type of data in the data processing pipeline, and the worker associated with such a node may be configured to write specified data to one or more data sinks in which processed data is to be stored. Different steps in the definition of the data pipeline may include, for example, processes which may be processed in parallel, do not rely on data generated by other processes in the same step of the data pipeline, and rely on steps in previous processes of the data pipeline.

At block 320, operations 300 proceed with converting the data processing pipeline into a plurality of steps. Generally, each step may be defined as one or more workers that can execute the processes identified by different nodes in the definition of the data processing pipeline. In some aspects, workers may be configured to perform discrete steps in the data processing pipeline; however, in other aspects, some workers may be configured to perform multiple steps in the data processing pipeline.

At block 330, operations 300 proceed with instantiating one or more workers to execute one or more steps of the plurality of steps (e.g., via coordinator creation message 212 and user process creation message 214 illustrated in FIG. 2). Each worker instantiated to execute one or more steps in the data processing pipeline may include a user process and a processing coordinator that coordinates termination of the user process, as well as other actions that the worker can perform during operations. For example, as discussed above, the processing coordinator may determine when the worker is ready to commence work and may serve as an intermediary between the user process of the worker and the associated input data sources and output data sinks. In some aspects, the processing coordinator may be configured to expose streaming data sources and data sinks (e.g., data sources that generate data continuously and that ingest data continuously) for the user process such that files or other non-streaming data (e.g., files or other mechanisms through which data is batched and received intermittently) from the input data sources are converted into streaming data before being provided to the user process for processing and such that streaming data from the user process is converted to files or other non-streaming data for commitment to the output data sinks. The processing coordinator may also be configured to instruct the user process to stop receiving messages from data sources and report, to the user process, an indication that the processing coordinator is ready to terminate operations.

In some aspects, to instantiate each worker of the one or more workers, the processing coordinator associated with the worker may be instantiated (e.g., via coordination creation message 212 illustrated in FIG. 2). The user process associated with the worker may subsequently be instantiated (e.g., via user process creation message 214 illustrated in FIG. 2). Generally, the user process associated with the worker may be configured to indicate, to the processing coordinator associated with the worker, a readiness to perform data input and output operations with the one or more data sources (e.g., via readiness handshake 216 illustrated in FIG. 2). For example, the user process may indicate its readiness to perform these operations during a readiness handshake process that is performed after the processing coordinator associated with the worker and the user process associated with the worker are instantiated, as discussed above. After indicating its readiness to perform these operations, the user process may perform these data input and output operations with the one or more data sources.

In some aspects, the processing coordinator may be an executable binary that can be copied to one or more computing resources. To instantiate the processing coordinator, an executable binary for the processing coordinator may be copied to a computing resource shared by the one or more workers. In some aspects, a single processing coordinator may be associated with multiple user processes, and this single processing coordinator may be terminated when each of the user processes associated with the single processing coordinator are also terminated. In some aspects, multiple instances of the processing coordinator may be instantiated from the executable binary, and each unique instance of the processing coordinator may be associated with a specific user process, and thus a specific worker, in the data processing pipeline.

At block 340, operations 300 proceed with orchestrating communications between one or more data sources and the one or more workers. Generally, in orchestrating communications between the one or more data sources and the one or more workers, the data pipeline controller can monitor or receive messages from the one or more workers indicating loading information, such as processor utilization, latency, a number of messages awaiting processing, or the like, and can scale the number of instantiated workers to account for increased processing needs or low compute resource utilization.

At block 350, operations 300 proceed with terminating the one or more workers. Generally, to terminate a worker, the data pipeline controller can invoke a termination procedure with the user process and the processing coordinator associated with each worker of the one or more workers. In some aspects, to terminate a worker, the data pipeline controller may invoke the termination process (e.g., via invoke termination procedure message 222 illustrated in FIG. 2) to cause the user process associated with the worker to finish work and stop receiving messages from one or more data sources. Subsequently, the data pipeline controller can receive an indication that the user process has been terminated (e.g., via termination handshake 224 illustrated in FIG. 2). Based on receiving this indication that the user process has been terminated, the processing coordinator can terminate the controller process associated with the worker.

In some aspects, the data pipeline controller can monitor an amount of message activity to or from the one or more workers. The number of instantiated workers may be scaled based on the monitored amount of message activity over a defined time interval. To monitor the amount of message activity, the data pipeline controller can periodically request message activity information from the worker processes and determine various statistical measures indicative of whether additional compute resources should be dedicated for the data processing pipeline or whether compute resources can be freed for allocation to other processes.

To scale the number of instantiated workers, in some aspects, a set of workers to be terminated may be identified. For each respective worker in the identified set of workers, the termination procedure exposed by the processing coordinator and the user process for the respective worker may be invoked to cause the user process for the respective work to finish work resulting from receiving messages from the one or more data sources. Subsequently, the data pipeline controller can receive an indication that the user process for the respective worker has terminated, and based on this indication, the data pipeline controller can terminate the processing coordinator for the respective worker.

In some aspects, to scale the number of instantiated workers, it may be determined that the amount of message activity on the one or more workers exceeds a threshold amount. The threshold amount may include, for example, an average number of messages awaiting processing by the workers, an average message latency, or other measures indicative of resource utilization by the one or more workers. If the amount of message activity on the one or more workers exceeds this threshold amount, one or more additional workers may be instantiated, as discussed above with respect to block 330.

As an example, a data processing pipeline may operate as part of or in conjunction with a software application provided as a service to many users, a website, etc. Generally, the amount of data processed by the data processing pipeline may scale with the number of users using the software application or website. In an example in which various compute resource utilization metrics (e.g., metrics related to errors, CPU usage, request latency, etc.) are processed by the data processing pipeline, it may be observed that these compute resource utilization metrics may increase in volume as more users use the software application or website (e.g., during peak usage periods, such as during daytime hours) and may correspondingly decrease in volume as the number of users using the software application or website decline (e.g., during off-peak usage periods, such as during nighttime hours). In such a case, the data processing pipeline may instantiate workers to process the compute resource utilization metrics during peak usage periods and may terminate at least some of the instantiated workers during off-peak usage periods using the techniques described herein.

Figure 4:
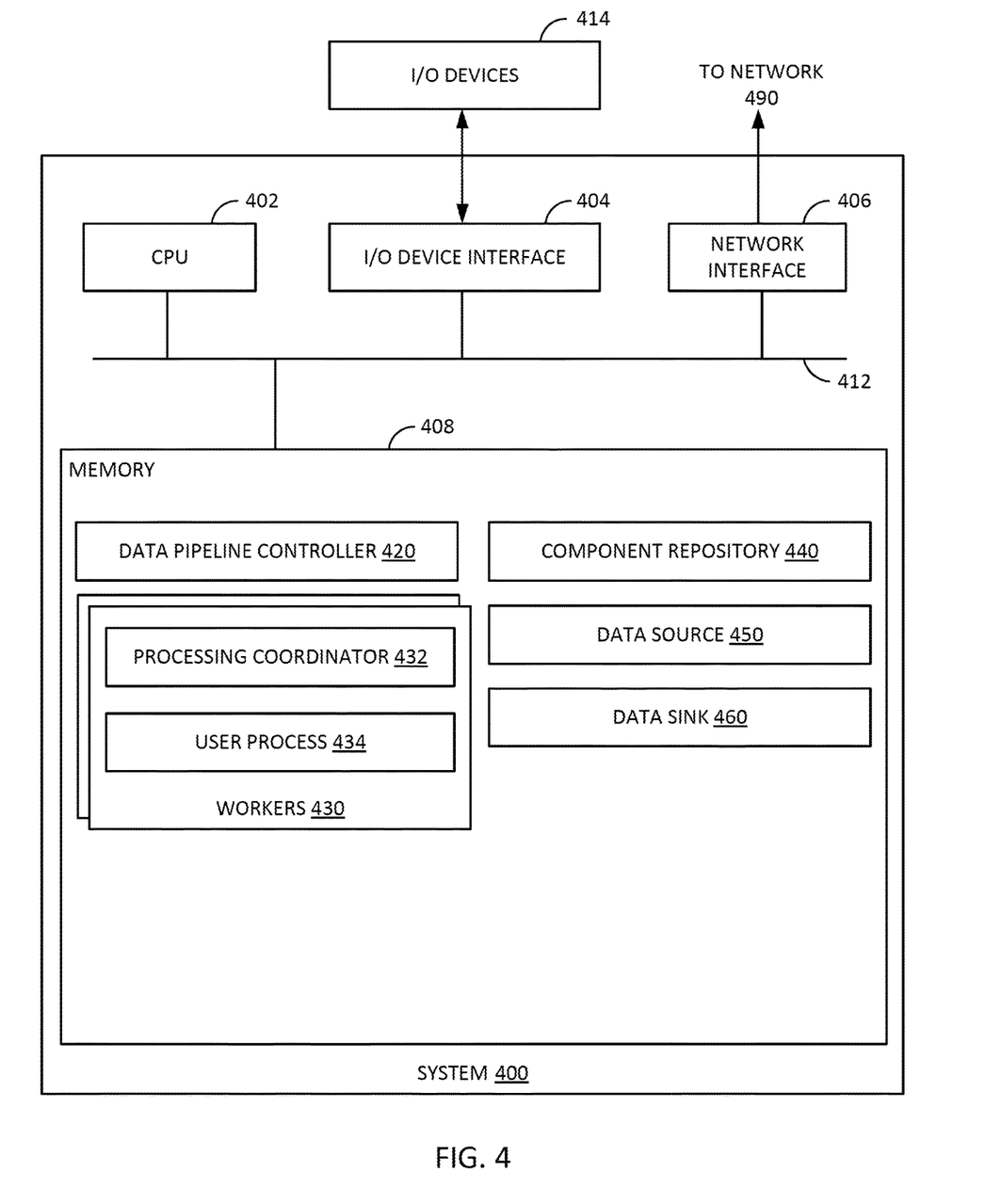
FIG. 4 illustrates an example computing system on which embodiments of the present disclosure may be implemented.

Example Systems for Dynamically and Reliably Scaling a Data Processing Pipeline in a Computing Environment FIG. 4 illustrates an example system 400 that can dynamically and reliably scale a data processing pipeline executing in a computing environment. For example, system 400 may comprise one more of compute resources 110 and component repository 120 illustrated in FIG. 1.

As shown, system 400 includes a central processing unit (CPU) 402, one or more I/O device interfaces 404 that may allow for the connection of various I/O devices 414 (e.g., keyboards, displays, mouse devices, pen input, etc.) to the system 400, network interface 406 through which system 400 is connected to network 490 (which may be a local network, an intranet, the internet, or any other group of computing devices communicatively connected to each other), a memory 408, storage 410, and an interconnect 412.

CPU 402 may retrieve and execute programming instructions stored in the memory 408. Similarly, the CPU 402 may retrieve and store application data residing in the memory 408. The interconnect 412 transmits programming instructions and application data, among the CPU 402, I/O device interface 404, network interface 404, memory 408, and storage 410.

CPU 402 is included to be representative of a single CPU, multiple CPUs, a single CPU having multiple processing cores, and the like.

Memory 408 is representative of a volatile memory, such as a random access memory, or a nonvolatile memory, such as nonvolatile random access memory, phase change random access memory, or the like. As shown, memory 408 includes a data pipeline controller 420, workers 430, component repository 440, data source 450, and data sink 460.

Data pipeline controller 420 may generally correspond to data pipeline controller 112 illustrated in FIG. 1. Generally, data pipeline controller 420 is configured to receive a definition of a data processing pipeline and convert the definition of the data processing pipeline into a plurality of steps defined as one or more workers. Data pipeline controller 420 can dynamically scale the one or more workers 430 instantiated to execute processes in the data processing pipeline based on an amount of message activity monitored from or reported by the workers 430. Generally, in instantiating a worker 430, data pipeline controller 420 can retrieve executable binaries from component repository 440 (which may correspond to component repository 120 illustrated in FIG. 1) and instantiate, for each worker 430, a processing coordinator 432 and a user process 434. To terminate a worker 430, data pipeline controller 420 can generate instructions to terminate the user process, which may invoke various procedures within worker 430 to halt reception of messages from data sources (e.g., via network interface 404), terminate the user process 434, and terminate the processing coordinator 432.

Worker 430 generally corresponds to a worker 114 illustrated in FIG. 1. Generally, worker 430 includes a processing coordinator 432 (which generally corresponds to a processing coordinator 116 illustrated in FIG. 1) and a user process 434 (which generally corresponds to a user process 118 illustrated in FIG. 1). Worker 430 may be deemed ready to process data and participate in the data processing pipeline (e.g., receive data for processing from data source 450 or a remote data source via network 490 and output processed data for storage at data sink 460 or a remote data sink via network 490) when the processing coordinator 432 and user process 434 are instantiated and when user process 434 indicates, to processing coordinator 432, its readiness to process data. To terminate worker 430, a termination message may be received at user process 434, and in response to receiving this termination message, user process 434 can instruct processing coordinator 432 to halt reception of messages from one or more data sources. After message reception is halted and the user process 434 finishes processing any messages remaining in a queue for processing, user process 434 and processing coordinator 432 may terminate and report their termination to data pipeline controller 420.

Example Clauses

Implementation details of various aspects are described in the following numbered clauses.

Clause 1: A method, comprising: receiving a definition of a data processing pipeline to be instantiated on a set of resources in a computing environment; converting the data processing pipeline into a plurality of steps, each step being defined as one or more workers; instantiating the one or more workers, each worker including a user process and a processing coordinator to coordinate termination of the user process; orchestrating communications between one or more data sources and the one or more workers; and terminating the one or more workers by invoking a termination process exposed by the user process and processing coordinator associated with each worker of the one or more workers.

Clause 2: The method of Clause 1, wherein the definition of the data processing pipeline comprises a directed graph identifying a plurality of steps in the data processing pipeline and relationships between each step of the plurality of steps in the data processing pipeline.

Clause 3: The method of any one of Clauses 1 or 2, further comprising: monitoring an amount of message activity on the one or more workers; and scaling a number of instantiated workers based on the monitored amount of message activity over a defined time interval.

Clause 4: The method of Clause 3, wherein scaling the number of instantiated workers comprises: identifying a set of workers to be terminated; and for each respective worker in the identified set of workers: invoking the termination process exposed by a processing coordinator and a user process of the respective worker to cause the user process of the respective worker to finish work resulting from receiving messages from the one or more data sources; receiving, subsequent to invoking the processing coordinator of the respective worker, an indication that the user process of the respective worker has terminated; and terminating the processing coordinator of the respective worker.

Clause 5: The method of Clause 4, wherein the processing coordinator of the respective worker comprises a process configured to coordinate communications between the one or more data sources and the user process of the respective worker.

Clause 6: The method of any one of Clauses 3 through 5, wherein scaling the number of instantiated workers comprises: determining that the amount of message activity on the one or more workers exceeds a threshold amount; and instantiating one or more additional workers based on the determining that the amount of message activity on the one or more workers exceeds a threshold amount.

Clause 7: The method of any one of Clauses 1 through 6, wherein terminating the one or more workers comprises: invoking the termination process exposed by the user process and the processing coordinator associated with each worker to cause user processes associated with the one or more workers to finish work and stop receiving messages from the one or more data sources; receiving, subsequent to invoking the processing coordinator, an indication that the user processes associated with the one or more workers have terminated; and terminating coordinator processes associated with the one or more workers.

Clause 8: The method of any one of Clauses 1 through 7, wherein the processing coordinator comprises a process configured to instruct the user process to stop receiving messages from the one or more data sources and report to the user process an indication of a readiness to terminate.

Clause 9: The method of any one of Clauses 1 through 8, wherein instantiating the one or more workers comprises, for each worker of the one or more workers: instantiating a coordinator process associated with the worker; and instantiating a user process associated with the worker, wherein the user process associated with the worker is configured to indicate to the coordinator process associated with the worker a readiness to perform data input and output operations with the one or more data sources and perform data input and output operations with the one or more data sources subsequent to indicating the readiness to perform data input and output operations.

Clause 10: The method of any one of Clauses 1 through 9, wherein instantiating the processing coordinator comprises copying the processing coordinator to a computing resource shared by the one or more workers.

Clause 11: A system, comprising: a memory having computer-executable instructions stored thereon; and a processor configured to execute the computer-executable instructions to cause the system to perform the operations of any of Clauses 1 through 10.

Clause 12: A system, comprising: means for performing the operations of any of Clauses 1 through 10.

Clause 13: A computer-readable medium having instructions stored thereon which, when executed by a processor, performs the operations of any of Clauses 1 through 10.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the embodiments set forth herein. In addition, the scope of the disclosure is intended to cover such an apparatus or method that is practiced using other structure, functionality, or structure and functionality in addition to, or other than, the various embodiments of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
    receiving a definition of a data processing pipeline to be instantiated on a set of resources in a computing environment;
    converting the data processing pipeline into a plurality of steps, each step being defined as one or more workers;
    instantiating the one or more workers, each worker including a user process and a processing coordinator to coordinate termination of the user process;
    orchestrating communications between one or more data sources and the one or more workers; and
    terminating the one or more workers by invoking a termination process exposed by the user process and processing coordinator associated with each worker of the one or more workers, wherein terminating the one or more workers comprises:
        invoking the termination process exposed by the user process and the processing coordinator associated with each worker to cause user processes associated with the one or more workers to finish work and stop receiving messages from the one or more data sources;
        receiving, subsequent to invoking the processing coordinator, an indication that the user processes associated with the one or more workers have terminated; and
        terminating coordinator processes associated with the one or more workers.

2. The method of claim 1, wherein the definition of the data processing pipeline comprises a directed graph identifying a plurality of steps in the data processing pipeline and relationships between each step of the plurality of steps in the data processing pipeline.

3. The method of claim 1, further comprising:
    monitoring an amount of message activity on the one or more workers; and
    scaling a number of instantiated workers based on the monitored amount of message activity over a defined time interval.

4. The method of claim 3, wherein scaling the number of instantiated workers comprises:
    identifying a set of workers to be terminated; and
    for each respective worker in the identified set of workers:
        invoking the termination process exposed by a processing coordinator and a user process of the respective worker to cause the user process of the respective worker to finish work resulting from receiving messages from the one or more data sources;
        receiving, subsequent to invoking the processing coordinator of the respective worker, an indication that the user process of the respective worker has terminated; and
        terminating the processing coordinator of the respective worker.

5. The method of claim 4, wherein the processing coordinator of the respective worker comprises a process configured to coordinate communications between the one or more data sources and the user process of the respective worker.

6. The method of claim 3, wherein scaling the number of instantiated workers comprises:
    determining that the amount of message activity on the one or more workers exceeds a threshold amount; and
    instantiating one or more additional workers based on the determining that the amount of message activity on the one or more workers exceeds a threshold amount.

7. The method of claim 1, wherein the processing coordinator comprises a process configured to instruct the user process to stop receiving messages from the one or more data sources and report to the user process an indication of a readiness to terminate.

8. The method of claim 1, wherein instantiating the one or more workers comprises, for each worker of the one or more workers:
    instantiating a coordinator process associated with the worker; and
    instantiating a user process associated with the worker, wherein the user process associated with the worker is configured to indicate to the coordinator process associated with the worker a readiness to perform data input and output operations with the one or more data sources and perform data input and output operations with the one or more data sources subsequent to indicating the readiness to perform data input and output operations.

9. The method of claim 1, wherein instantiating the processing coordinator comprises copying the processing coordinator to a computing resource shared by the one or more workers.

10. A system, comprising:
a memory having executable instructions stored thereon; and
a processor configured to execute the executable instructions to cause the system to:
receive a definition of a data processing pipeline to be instantiated on a set of resources in a computing environment;
convert the data processing pipeline into a plurality of steps, each step being defined as one or more workers;
instantiate the one or more workers, each worker including a user process and a processing coordinator to coordinate termination of the user process;
orchestrate communications between one or more data sources and the one or more workers; and
terminate the one or more workers by invoking a termination process exposed by the user process and processing coordinator associated with each worker of the one or more workers, wherein in order to terminate the one or more workers, the processor is configured to cause the system to:
invoke the termination process exposed by the user process and the processing coordinator associated with each worker to cause user processes associated with the one or more workers to finish work and stop receiving messages from the one or more data sources;
receive, subsequent to invoking the processing coordinator, an indication that the user processes associated with the one or more workers have terminated; and
terminate coordinator processes associated with the one or more workers.

11. The system of claim 10, wherein the processor is further configured to cause the system to:
monitor an amount of message activity on the one or more workers; and
scale a number of instantiated workers based on the monitored amount of message activity over a defined time interval.

12. The system of claim 11, wherein in order to scale the number of instantiated workers, the processor is configured to cause the system to:
identify a set of workers to be terminated; and
for each respective worker in the identified set of workers:
invoke the termination process exposed by a processing coordinator and a user process of the respective worker to cause the user process of the respective worker to finish work resulting from receiving messages from the one or more data sources;
receive, subsequent to invoking the processing coordinator of the respective worker, an indication that the user process of the respective worker has terminated; and
terminate the processing coordinator of the respective worker.

13. The system of claim 12, wherein the processing coordinator of the respective worker comprises a process configured to coordinate communications between the one or more data sources and the user process of the respective worker.

14. The system of claim 11, wherein in order to scale the number of instantiated workers, the processor is configured to cause the system to:
determine that the amount of message activity on the one or more workers exceeds a threshold amount; and
instantiate one or more additional workers based on the determining that the amount of message activity on the one or more workers exceeds a threshold amount.

15. The system of claim 10, wherein the processing coordinator comprises a process configured to instruct the user process to stop receiving messages from the one or more data sources and report to the user process an indication of a readiness to terminate.

16. The system of claim 10, wherein in order to instantiate the one or more workers, the processor is configured to cause the system to, for each worker of the one or more workers:
instantiate a coordinator process associated with the worker; and
instantiate a user process associated with the worker, wherein the user process associated with the worker is configured to indicate to the coordinator process associated with the worker a readiness to perform data input and output operations with the one or more data sources and perform data input and output operations with the one or more data sources subsequent to indicating the readiness to perform data input and output operations.

17. The system of claim 10, wherein in order to instantiate the processing coordinator, the processor is configured to cause the system to copy the processing coordinator to a computing resource shared by the one or more workers.

18. A method, comprising:
receiving a definition of a data processing pipeline to be instantiated on a set of resources in a computing environment;
converting the data processing pipeline into a plurality of steps, each step being defined as one or more workers;
instantiating the one or more workers, each worker including a user process and a processing coordinator to coordinate termination of the user process;
orchestrating communications between one or more data sources and the instantiated one or more workers;
monitoring an amount of message activity on the one or more workers; and
scaling a number of the instantiated one or more workers based on the monitored amount of message activity over a defined time interval; and
terminating the one or more workers by invoking a termination process exposed by the user process and processing coordinator associated with each worker of the one or more workers, wherein terminating the one or more workers comprises:
invoking the termination process exposed by the user process and the processing coordinator associated with each worker to cause user processes associated with the one or more workers to finish work and stop receiving messages from the one or more data sources;
receiving, subsequent to invoking the processing coordinator, an indication that the user processes associated with the one or more workers have terminated; and
terminating coordinator processes associated with the one or more workers.

* * * * *